United States Patent [19]

Stanfield et al.

[11] 4,026,756

[45] * May 31, 1977

[54] APPARATUS FOR REPAIRING ELONGATED FLEXIBLE STRIPS HAVING DAMAGED SPROCKET FEED HOLES ALONG THE EDGE THEREOF

[76] Inventors: James S. Stanfield, 1236 Amherst St., Apt. No. 1, Los Angeles, Calif. 90025; Paul W. Trester, 2312 Ninth St., Olivenhain, Calif. 92024

[ * ] Notice: The portion of the term of this patent subsequent to May 26, 1993, has been disclaimed.

[22] Filed: Mar. 19, 1976

[21] Appl. No.: 668,613

[52] U.S. Cl. .................................. 156/554; 156/94; 156/436; 156/543; 156/555; 226/76; 226/85; 226/109; 242/58.1; 242/58.5; 352/130; 425/11

[51] Int. Cl.[2] .................. B32B 31/04; B32B 35/00

[58] Field of Search .................. 425/11, 14, 94; 156/436, 459, 552, 543, 556, 157, 554, 555; 226/85 X, 109, 87 X, 76 X; 242/58.1, 58.5; 352/232, 130

[56] References Cited

UNITED STATES PATENTS

| | | | |
|---|---|---|---|
| 1,389,775 | 9/1921 | Mueller | 226/85 |
| 2,100,535 | 11/1937 | Boggs | 226/85 |
| 3,959,048 | 5/1976 | Standfield et al. | 425/11 |

*Primary Examiner*—Edward G. Whitby

[57] ABSTRACT

Disclosed is a new and improved apparatus for aligning and bonding a pre-perforated flexible repair tape to the side edge portion of an elongated strip, such as motion picture film, having damaged sprocket feed hole perforations located therealong. Film to be repaired is fed continuously from a supply reel to a repair station comprising a grooved pressure roller cooperating with a sprocket roller specifically designed to more precisely align the preformed feed holes of the tape with the damaged feed hole locations of the film, and to bond the tape and film together in the aligned condition, the laminated tape and film thereafter being directed over an exit ramp to a storage reel for collection.

16 Claims, 7 Drawing Figures

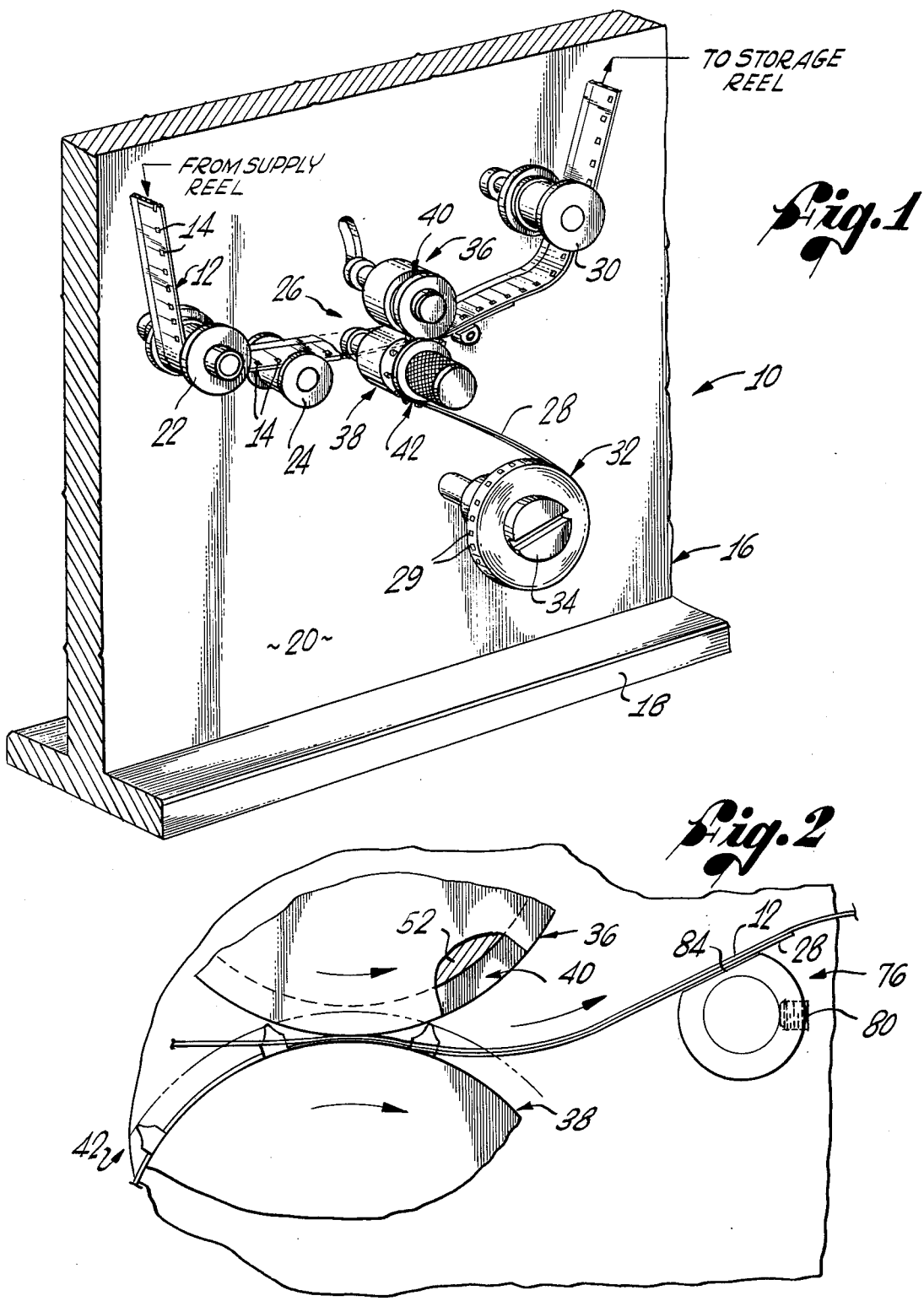

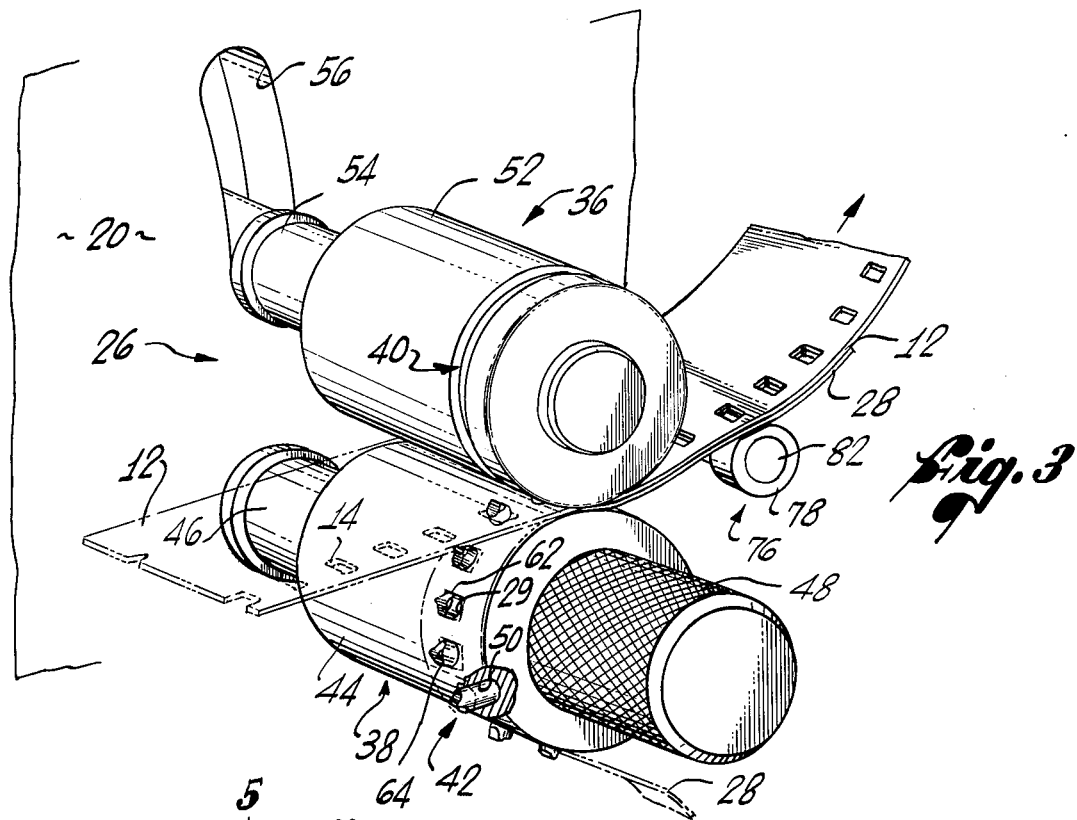
*fig. 3*
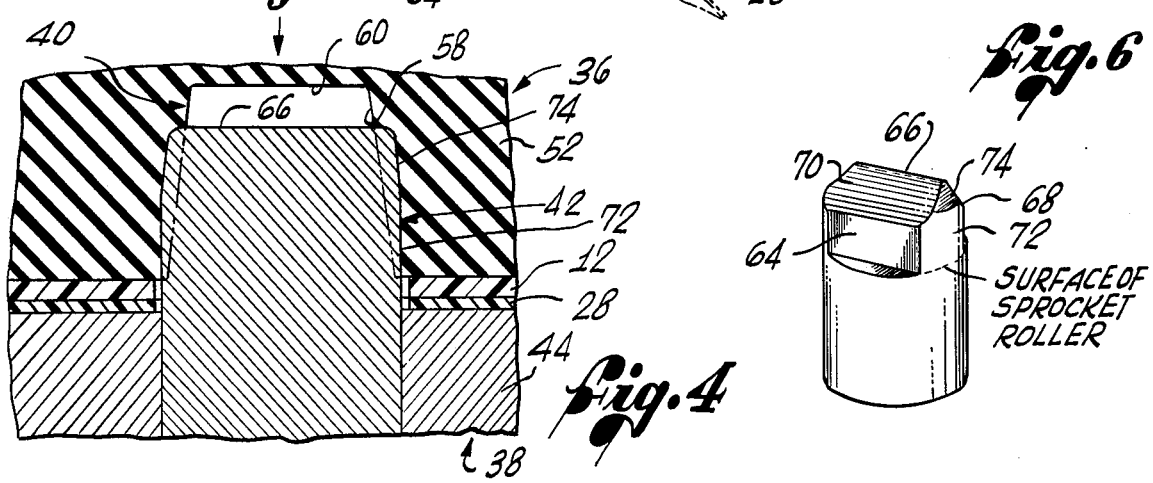
*fig. 4*
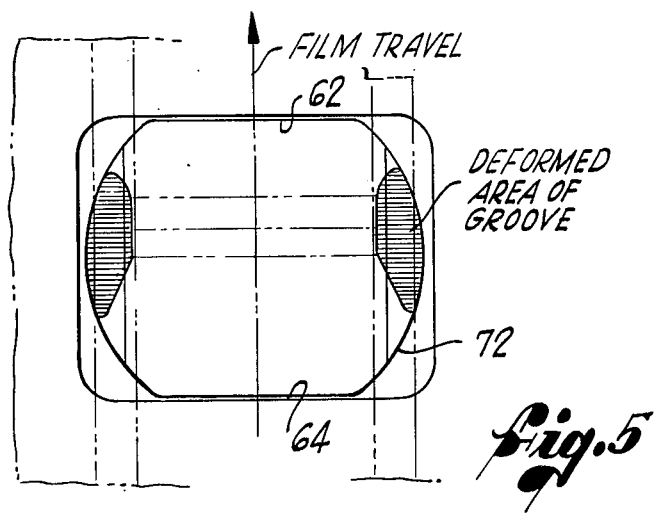
*fig. 5*
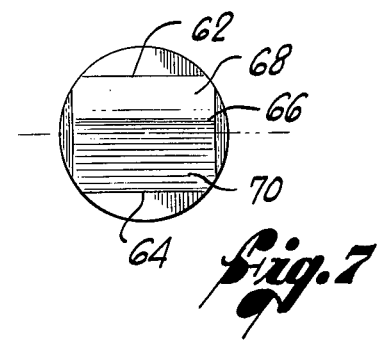
*fig. 6*
*fig. 7*

APPARATUS FOR REPAIRING ELONGATED FLEXIBLE STRIPS HAVING DAMAGED SPROCKET FEED HOLES ALONG THE EDGE THEREOF

CROSS-REFERENCE TO RELATED APPLICATION

This application is an improvement over our copending application entitled "Apparatus and Method For Repairing Elongated Flexible Strips Having Damaged Sprocket Feed Holes Along The Edge Thereof", Ser. No. 528,028, filed Nov. 29, 1974 now U.S. Pat. No. 3,959,048.

BACKGROUND OF THE INVENTION

This invention relates to repair of elongated, flexible perforated strips such as tape, film and the like, and more specifically, relates to a new and improved apparatus for repairing damaged sprocket feed hole perforations located along the edges of such strips, particularly motion picture film strips.

Motion picture film strips, as well as numerous other types of elongated, flexible perforated strips, include rows of perforations called sprocket feed holes along one or both edges of the strips and which are engaged by the teeth of a shuttle arm or sprocket wheel of automated equipment such as projectors to drive the strips through the equipment during use. It is not uncommon for the driving teeth to tear and damage the strip in the area of the sprocket feed holes, this being particularly true in the case of commercial film strips which may be shown many times a day over long periods, and in the case of educational films which frequently are shown by inexperienced projectionists in schools and the like.

In our copending application, Ser. No. 528,028 filed Nov. 29, 1974, there is disclosed a method and an apparatus for repairing damaged sprocket feed holes by laminating a narrow, elongated pre-perforated repair tape to the damaged areas of the strips. While the apparatus disclosed in that pending application performs its function in a highly satisfactory manner in most situations, there remains a need for an apparatus which will laminate repair tape to damaged areas of a strip with greater precision and accuracy than heretofore possible.

SUMMARY OF THE INVENTION

The present invention provides a new and improved apparatus for applying any selected length of elongated flexible repair tape to the damaged side edge portion of an elongated flexible strip in a manner which insures that the replacement sprocket feed hole perforations of the tape are very precisely and accurately aligned with the locations of the original damaged sprocket feed hole perforations of the strip. Moreover, with the present invention, the repair tape is applied to the strip in a simple, reliable, and effective manner, and permits very long lengths of a damaged strip to be quickly and easily repaired, no matter how much the strip has shrunk nor how badly the side edge portion has been damaged.

More specifically, the apparatus of the present invention includes a new and improved repair station having cooperating pressure and sprocket rollers specifically designed and formed for very accurately and precisely aligning the repair tape with the side edge portion of the strip to be repaired so that the perforations in the repair tape substantially coincide to within a very narrow and critical tolerance range with the original locations of the damaged sprocket feed holes. The pressure roller has a circumferential groove therein which cooperates with uniquely-shaped sprocket teeth carried by the sprocket roller to produce extremely accurate and precise alignment of the tape and strip, and to produce smoother and more effective operation of the apparatus.

The sprocket teeth have a cross-sectional shape quite different from conventional sprocket teeth and include substantially flat leading and trailing faces on the lower portion of each tooth which extend perpendicularly for a substantial distance outwardly from the cylindrical surface of the sprocket roller. These perpendicular faces establish and maintain very precise longitudinal alignment of the tape and strip, even if they should ride up on the tooth face. Additonally, the lateral sides of each tooth are accurate in shape and formed and dimensioned to maintain very precise lateral alignment between the tape and strip.

As viewed along the axis of the sprocket roller, each tooth is asymmetrical with the leading perpendicular face of the tooth significantly higher than the trailing perpendicular face, and the tooth is tapered to a tip or crest which is slightly closer to the leading face than to the trailing face. The tapering slopes on the tooth faces are selected to permit the easiest possible entry and exit of the tip into and from the perforations while insuring proper alignment of the tape and strip.

In accordance with another important feature of the invention, the repair station includes an exit ramp over which the repaired strip is directed to lift the combined strip and tape from the teeth of the sprocket roller. The location of the exit ramp relative to the pressure and sprocket rollers is selected so that it prevents damage to the repaired strip due to undesirable looping or bowing and prevents undesirable tension in the repaired strip which could adversely affect the longitudinal alignment of the unrepaired tape and strip during initial alignment and lamination in the nip of the pressure and sprocket rollers.

Many additional features and advantages of the present invention will become more apparent from the following detailed description taken in conjunction with the accompanying drawings which disclose, by way of example, the principles of the invention.

BRIEF DESCRIPTION OF THE DRAWINGS

FIG. 1 is a fragmentary front elevational view of an apparatus having a repair station embodying the principles of the present invention and shown in connection with the repair of a damaged motion picture film strip;

FIG. 2 is an enlarged, fragmentary side elevation, partly in cross-section of the repair station of the apparatus of FIG. 1;

FIG. 3 is an enlarged, fragmentary perspective view of the repair station of the apparatus of FIG. 1;

FIG. 4 is an enlarged fragmentary sectional view of the interaction of the pressure roller and a sprocket tooth of the repair station of the apparatus of FIG. 1 and taken perpendicular to the direction of tooth motion;

FIG. 5 is a further enlarged and fragmentary schematic top plan view taken substantially in the direction of the arrow 5 of FIG. 4;

FIG. 6 is an enlarged perspective view of a sprocket tooth of the apparatus of FIG. 1; and FIG. 7 is an enlarged top plan view of the sprocket tooth of FIG. 6.

DETAILED DESCRIPTION

As shown in the exemplary drawings, the present invention is embodied in a new and improved apparatus 10 for repairing substantial continuous lengths of elongated, flexible strips 12 having relatively large numbers of sprocket feed hole perforations 14 along one or both side edge portions, and which have been damaged during handling or use. In this instance, the overall apparatus 10 is generally similar to that disclosed in our aforementioned copending application, and is illustrated in connection with the repair of a motion picture film strip 12.

As shown in FIG. 1, the apparatus 10 herein includes a frame 16 comprising a generally horizontal base 18 and upstanding support plate 20 carrying a pair of feed spools 22 and 24 which direct film to be repaired from a supply reel (not shown) into a repair station 26 where a repair tape 28 having preperforated replacement sprocket feed holes 29 is aligned with, and laminated to the film. From the repair station 26, the repaired film 12 is directed around an exit spool 30 to take-up or storage reel (not shown) for collection.

The repair tape 28, which can be such as that made by E. I. duPont de Nemours and Co. under its trademark "Mylar" and having a pressure-sensitive adhesive on one side, is supplied from a roll 32 supported on a spindle 34 below the repair station 26. Preparatory to use, the roll 32 is cut so that only the lateral side edge portion of the tape 28 carrying the replacement feed holes 29 remains.

Briefly, and by way of background, it should be noted that commercially available pre-perforated repair tape, typically used heretofore for making butt splices between two terminal ends of film strips, is normally provided with sprocket feed hole perforations which meet the standards for such perforations in new, undeveloped motion picture film strips. The standards for such perforations are well known and published by the American National Standards Institute (ANSI).

As set by ANSI, the standards for 16 mm film, often used for educational films, include generally rectangular shaped sprocket feed holes which are spaced apart a distance 0.300 inches (0.762 cm) from the center of one perforation to the center of the next along the edge of the film, with each hole having a height in the lengthwise direction of the film of 0.050 inches (0.127 cm), and a width in the lateral direction of the film of 0.072 inches (0.183 cm). 35 mm film used for commercial films includes standards set by ANSI of 0.187 inches (0.475 cm) between sprocket feed hole perforations from center to center along the edge of the film, 0.110 and 0.078 inches (0.279 and 0.198 cm), depending upon the type of film, for the sprocket feed hole width, and 0.073 and 0.078 inches (0.185 cm and 0.198 cm) for the height of the sprocket feed holes, again depending upon the type of film. In the case of 16 mm films, the sprocket feed holes are perforated 0.0355 inches (0.090 cm) laterally inwardly from the side edge of the film, and in 35 mm films, the sprocket feed holes are perforated either 0.079 or 0.086 inches (0.201 or 0.218 cm) inwardly from the film edge, depending upon the type of film.

It has long been recognized that considerable film shrinkage occurs as a result of processing, storing and use of motion picture film and this has been one of the major problems that has long plagued the motion picture film repair art. Typically, film will shrink as its age increases, and quite often shrinkage will occur during the initial developing process as well. Further, atmospheric conditions such as humidity and temperature may cause dimensional changes in the film size.

As a result of changes in film size, which can in some instances be quite great, the size and spacing of the sprocket feed hole perforations in the film also change. Thus, the standards set by ANSI only apply to tape or film immediately after cutting and perforating, and when repair tape, which typically does not shrink appreciably with age, is applied to developed and old film, the size of and the spacing between the sprocket feed holes of the tape may be considerably greater than that of the film thereby rendering alignment of the sprocket feed holes of the tape with that of the film extremely different, especially when very long lengths of film must be repaired.

By way of illustration, in an article published by the Society of Motion Picture and Television Engineers, Inc., entitled "Interpretation of Dimensional Changes in Cellulose Ester Base Motion-Picture Films" by P. Z. Adelstein and J. M. Calhoun, Journal of the SMPTE, Volume 69, March 1960, at pages 157-163, it was reported that triacetate positive motion picture film manufactured by the Eastman Kodak Co., would shrink in the lengthwise direction on the average of 0.40% after 6 years while negative triacetate film would shrink on the average of 0.18% after 6 years. After only two years, the report indicated a lengthwise shrinkage of about 0.27% on the average for positive film and 0.17% for negative film.

In accordance with the present invention, the repair station 26 includes cooperating pressure and sprocket rollers 36 and 38, respectively, which are specifically designed and formed to more accurately and precisely align the feed holes 29 of the tape 28 with the feed hole locations 14 of the film 12 than heretofore possible, and to do so in a more smooth, reliable and effective manner. Toward this end, the pressure roller 36 has a peripheral groove 40 which receives specifically and uniquely shaped sprocket teeth 42 carried by the sprocket roller 38 to feed, align, and laminate the repair tape 28 to the film 12.

With reference primarily to FIG. 3, the sprocket roller 38 herein comprises a cylindrical metal sleeve 44 secured to a shaft 46 journaled to the frame 16 for rotation, and having a knob 48 projecting from its outer end for manually rotating the sprocket roller. The sprocket teeth 42 are herein individually formed and secured to the sprocket roller 38 in cylindrical bores 50 spaced circumferentially around the periphery of the sprocket roller adjacent its outer end.

The pressure roller 36 is biased, by means not shown, toward film frictional engagement against the sprocket roller 38, and herein comprises a resilient sleeve 52 secured to a shaft 54 which projects through an arcuate slot 56 in the frame 16. By rotation of the knob 48 of the sprocket roller 38, the frictional coupling between the sprocket roller and the pressure roller 36 will produce substantially simultaneous rotation of the pressure roller. To facilitate insertion and removal of the film 12, the pressure roller 36 can be manually raised out of its normal position by lifting the pressure roller to move its shaft 54 upwardly through the slot 56.

As can best be seen in FIGS. 4 and 5, the groove 40 is formed as a continuous circumferential recess in the resilient sleeve 52, which herein is made of rubber, and is positioned to overlie and receive the sprocket teeth 42 of the sprocket roller 38. The groove 40 has generally flat sides 58 and a flat bottom 60, and has a depth greater than the height of the sprocket teeth 42 to permit the teeth to be fully received in the groove.

To insure maintenance of accurate alignment and lamination of the feed holes 29 of the tape 28 with the feed hole locations 14 of the film 12, the width of the groove 40 is formed to be slightly less than the maximum width of the sprocket teeth 42. In this instance, the sides 58 of the groove taper inwardly toward the bottom 60, and when the teeth 42 enter the groove 40, the sides of the groove will deform around the teeth, as illustrated in the schematic of FIG. 5. This facilitates initial lateral and longitudinal alignment and firmly holds the film 12 in proper register with the tape 28 to prevent the film and tape from riding up the teeth 42 which could cause disalignment to occur prior to bonding.

To provide early engagement and alignment with the perforations 14 of the film 12 for establishing and maintaining proper registration of the film and tape 28 prior to initial contact, the sprocket teeth 42 are formed to project a substantial distance above the peripheral surface of the sprocket roller 38. As can best be seen in FIGS. 3, 6 and 7, to insure accurate longitudinal alignment of the replacement feed holes 29 with the sprocket feed hole locations 14 of the film 12, each tooth 42 includes a substantially flat leading face 62 and a substantially flat trailing face 64 which are both formed to be substantially perpendicular to the peripheral surface of the sprocket roller 38.

For ease of entry into and exit from the feed hole perforations 14 and 29, the leading face 62 of each tooth 42 is higher than the trailing face 64 (see FIG. 2), and the tooth is tapered to a rounded crest or tip 66 located closer to the leading face than the trailing face (see FIGS. 2 and 7). Also, preferably the leading and trailing faces 62 and 64 are joined at their extremities by concavely curved surfaces 68 and 70, respectively, which converge upwardly to the tip 66. It should be noted that the exact shape of the curved surfaces 68 and 70 is not cricitcal to operation of the apparatus 10, so long as the tapered upper portion of the tooth 42 can easily enter and leave the perforations 14 of the film 12 and the perforations 29 of the tape 28.

As shown in FIGS. 6 and 7, to ensure accurate lateral alignment of the tape 28 and film 12, each tooth 42 also has two similar lateral side faces 72 which herein are rounded as viewed from above, and are perpendicular to the peripheral surface of the sprocket roller 38. To facilitate insertion and removal of the teeth 42 into or out of the perforations 14 and 29 of the film 12 and tape 28, respectively, the upper end portions 74 of the lateral side faces 72 are tapered laterally inwardly toward each other, as best seen in FIG. 6.

To insure proper alignment of the sprocket feed holes 29 of the tape 28 with the feed hole locations 14 of the film 12, the teeth 42 must be precisely and accurately formed. One preferred method of forming the teeth 42 is to utilize cylindrical wire rods which are accurately machined to the required tooth shape and dimensions and then received in the bores 50 of the sprocket roller 38. Other methods can also be used to form the teeth 42, such as to separately mold or mill the teeth or to mold or mill the teeth 42 integrally with the sprocket roller 38.

It should be appreciated that the sprocket roller and pressure roller 36 may be designed for any film and sprocket sizes, and the rollers 38 and 36 are replaceable to allow different sizes to be accommodated. By way of example, for the repair of 16 mm. film, typical dimensions for the teeth 42 are: 0.047 inch (0.119 cm.) longitudinal spacing between the leading and trailing faces 62 and 64 in the direction of the sprocket roller 38; 0.067 inch (0.170 cm.) lateral spacing between the side faces 72; 0.060 inch (0.152 cm.) overall height from the peripheral surface of the sprocket roller; 0.035 inch (0.089 cm.) height of the leading face 62; 0.025 inch (0.064 cm.) height of the trailing face 64; and 0.005 inch (0.013 cm.) offset of the tip 66 from the lateral centerline of the tooth. For 16 mm. film, the groove 40 in the pressure roller 36 should have a maximum lateral width of 0.060 inch (0.152 cm.) and be 0.100 inch (0.254 cm.) in depth and formed in a rubber sleeve 52 of Shore A65 typical hardness value.

For repair of 35 mm. film, typical exemplary dimensions for the teeth 42 are: 0.072 inch (0.183 cm.) longitudinal spacing between the leading and trailing faces 62 and 64; 0.106 inch (0.269 cm.) lateral width; 0.050 inch (0.127 cm.) overall height; 0.028 inch (0.071 cm.) height of leading face 62; 0.022 inch (0.056 cm.) height of trailing face 64; and 0.010 inch (0.025 cm.) offset of tip from lateral centerline. In this case, the groove 40 should have a maximum lateral width of 0.100 inch (0.254 cm.) which can be tapered inwardly to 0.087 inch (0.221 cm.), and a depth of 0.053 inch (0.135 cm.).

It is noteworthy that due to the height of the sprocket teeth 42, and primarily the flat leading face 62 of each tooth, the repaired film 12 emerging from the nip of the pressure and sprocket rollers 36 and 38 will tend to be retained on the tooth leaving the nip as the sprocket roller turns. To provide a force to lift the repaired film 12 off the teeth 42 of the sprocket roller 38, an exit ramp 76 is disposed downstream from the pressure and sprocket rollers 36 and 38.

In this instance, as best shown in FIGS. 2 and 3, the exit ramp 76 comprises a cylindrical sleeve 78 secured by a set screw 80 to a post 82 attached to the frame 16, and has a flat surface 84 formed along a portion of the side of the sleeve. It should be appreciated that various other configurations are possible for the ramp 76, the critical factor being to provide a means for lifting the repaired film 12 off the teeth 42 of the sprocket roller 38 without significantly affecting alignment of the tape 28 and film 12 during lamination, and without permitting the repaired film to loop or bow excessively.

While various locations for the exit ramp 76 relative to the nip of the pressure and sprocket rollers 36 and 38 are possible, it has been found that if the ramp is located too far from the nip of the rollers, excessive looping or bowing of the repaired film 12 will result, and thus hinder release of the repaired film from the teeth. If the ramp 76 is placed too low, the repaired film 12 will not be released from the sprocket tooth 42 exiting the nip quickly enough, and will tend to be pulled excessively by the sprocket roller with the result that subsequent misregistration of the film and tape 28 may occur at the nip of the pressure and sprocket rollers 36 and 38. Similarly, if the exit ramp 76 is placed too high relative to the nip of the pressure and sprocket rollers 36 and 38, forces will be imparted through the repaired film 12 to the unrepaired film entering the nip of the rollers and produce undesirable misregistration of the tape 28 and film.

In an apparatus constructed in accordance with the principles of the present invention, it was found that an exit ramp 76 positioned, as shown in FIG. 2, a short distance to the right of the nip of the pressure and sprocket rollers 36 and 38 and with a post 82 having a centerline lying approximately along a horizontal plane defined by the point of tangency between the pressure and sprocket rollers produced highly satisfactory results. In that instance, the flat surface 84 of the sleeve 78 was formed to define a vertical angle of about twenty degrees with the horizontal plane.

By virtue of the cooperation of the groove 40 and teeth 42, the apparatus 10 produces greater precision in the registration of the sprocket feed holes 29 of the tape 28 with the sprocket feed hole locations 14 of the film 12 than heretofore possible. Since the pressure roller 36 employs a groove 40, rather than discrete holes, lateral and circumferential alignment is automatically achieved when the pressure roller is lowered into its operative position against the sprocket roller 38.

Further, due to the cross-sectional shape and increased height of the sprocket teeth 42, the maximum extent of disalignment between the sprocket holes 29 of the tape 28 and the feed hole locations 14 of the film 12 is limited to the maximum clearance between the cross-sectioned dimensions of the teeth and the corresponding dimensions of the sprocket feed holes of the tape. Thus, the apparatus 10 operates more smoothly and uniformly than heretofore possible, and even jerky turning of the sprocket roller 38 will not likely produce disalignment of the tape 28 and film 12.

In comparative tests of an apparatus as disclosed in our aforementioned application and as disclosed herein, it was found that significantly improved results were achieved with the apparatus of this invention, particularly where film shrinkage was excessive. By way of example, it was found that a 25 percent average improvement in longitudinal registration of the sprocket feed hole locations of a 16 mm. film and the replacement feed holes of the tape occurred when the film shrinkage was up to 0.25%. With a film shrinkage of between 0.25% and 0.48%, it was found that the present apparatus performed successfully, while the apparatus of our prior application experienced occasional malfunction due to longitudinal disalignment when continuous lengths in excess of one foot were repaired.

Similarly, with 35 mm. film, it was found that an improvement in longitudinal registration of up to ten percent occurred with film having a degree of shrinkage up to 0.21%, and for film having a degree of shrinkage between 0.21% and 0.53%, apparatus of this invention performed satisfactorily with over sixty percent improvement in longitudinal registration. In lateral registration, the apparatus of this invention produced over a 55 percent increase in registration as compared with the apparatus of our prior application for both 16 mm. and 35 mm. film having degrees of longitudinal shrinkage up to 0.48% and 0.53%, respectively.

From the foregoing, it can be appreciated that the present invention provides an apparatus 10 capable of repairing substantial lengths of elongated flexible strips having a relatively large number of damaged sprocket feed hole perforations with greater precision than heretofore possible. Further, the apparatus 10 of this invention operates smoothly, uniformly, and effectively to laminate repair tape to the side edge portion of a flexible strip and to do so quickly and easily with very precise lateral and longitudinal alignment of the replacement sprocket feed holes of the tape with the damaged sprocket feed hole locations of the strip.

While a presently preferred embodiment of the invention has been illustrated and described herein, it will be apparent that variations and modifications therein can be made without departing from the spirit and scope of the invention as defined by the following claims.

We claim:

1. An apparatus for repairing substantial continuous lengths of elongated flexible film strips having a relatively large number of damaged sprocket feed hole perforations along one side edge portion thereof by laminating thereto an elongated flexible repair tape carrying preformed replacement feed hole perforations therein, said apparatus comprising:
   a repair station including a rotatable sprocket roller having a plurality of upstanding peripheral teeth disposed adjacent one end, each of said teeth having a cross-sectioned shape dimensioned to receive and substantially fill the space defined by a replacement sprocket feed hole of said tape, and a rotatable pressure roller biased toward engagement with said sprocket roller, said pressure roller having a circumferential groove therein dimensioned to receive said teeth of said sprocket roller;
   means for directing continuously said film into said repair station and onto said teeth;
   means for feeding a continuous supply of tape onto said teeth and into said repair station whereby said pressure and sprocket roller cooperate to align and laminate said tape and film with the replacement feed holes of said tape aligned laterally and longitudinally with the feed hole location of said film; and
   means for collecting the repaired film after leaving said repair station.

2. An apparatus as defined in claim 1 in which each of said teeth includes a substantially flat leading face and a substantially flat trailing face for longitudinally aligning the replacement feed holes of said tape with the feed hole locations of said film.

3. An apparatus as defined in claim 1 in which each of said teeth includes lateral side faces which project substantially vertically from the peripheral surface of said sprocket roller, said lateral sides being dimensioned to align literally said replacent feed holes of said tape with said feed hole locations of said film.

4. An apparatus as defined in claim 1 in which each of said teeth includes a lower portion having a substantially flat leading face and a substantially flat trailing face each substantially perpendicular to the peripheral surface of said sprocket roller, and substantially perpendicular lateral side faces interconnecting said leading and trailing faces, said leading and trailing faces being dimensioned to longitudinally align the replacement feed holes of said tape with the feed hole locations of said film, and said lateral side faces being dimensioned to align laterally the replacement feed holes and sprocket feed hole locations.

5. An apparatus as defined in claim 4 in which each of said teeth further includes an upper portion tapered to provide ease of entry into and exit from said feed hole perforations.

6. An apparatus as defined in claim 1 including means defining an exit ramp disposed adjacent said repair station and positioned to aid in lifting said repaired film from said teeth after lamination in said repair station and before collection.

7. An apparatus for repairing substantial continuous lengths of elongated flexible strips having a relatively large number of damaged sprocket feed hole perforations along one side edge portion thereof by laminating thereto an elongated flexible repair tape carrying preformed replacement feed hole perforations therein, said apparatus comprising:

means for sequentially aligning each preformed feed hole carried by said tape with each successive feed hole location along said side edge portion of said strip in a manner such that each of said preformed feed holes in said tape substantially coincides with the corresponding feed hole location on said strip, said aligning means including a roller carrying a plurality of upstanding teeth each having a cross-sectional shape dimensioned to substantially fill the space defined by a replacement feed hole;

and means for sequentially bonding said tape to said side edge portion of said strip while maintaining said aligned condition, said bonding means including a pressure roller biased toward engagement with said sprocket roller and having a peripheral groove adapted to receive said teeth of said sprocket roller, whereby said sprocket roller and said pressure roller cooperate to laminate said tape to said strip with each of said preformed feed holes substantially coinciding with each of said damaged feed hole locations along said strip.

8. An apparatus as defined in claim 7 in which each of said teeth includes a lower portion having a substantially flat leading face and a substantially flat trailing face each substantially perpendicular to the peripheral surface of said sprocket roller, and lateral side faces interconnecting said leading and trailing faces, said leading and trailing faces being dimensioned to longitudinally align the replacement feed holes of said tape with the feed hole locations of said strip, and said lateral side faces being dimensioned to align laterally the replacement feed holes and sprocket feed hole locations.

9. An apparatus as defined in claim 8 in which each of said teeth further includes an upper portion tapered to provide ease of entry into and exit from said feed hole perforations.

10. An apparatus as defined in claim 7 including means defining an exit ramp disposed adjacent said repair station and positioned to aid in lifting said repaired film from said teeth after lamination in said repair station and before collection.

11. An apparatus as defined in claim 10 in which each of said teeth includes a lower portion having a substantially flat leading face and a substantially flat trailing face each substantially perpendicular to the peripheral surface of said sprocket roller, and substantially perpendicular lateral side faces interconnecting said leading and trailing faces, said leading and trailing faces being dimensioned to longitudinally align the replacement feed holes of said tape with the feed hole locations of said strip, and said lateral side faces being dimensioned to align laterally the replacement feed holes and sprocket feed hole locations.

12. In an apparatus of the type for repairing substantial continuous lengths of elongated flexible strips having a relatively large number of damaged sprocket feed hole perforations along one side edge portion thereof by laminating thereto an elongated flexible repair tape carrying preformed replacement feed holes therein, said apparatus including a sprocket roller carrying a plurality of upstanding teeth around a portion of the periphery thereof and which align the feed hole perforations of the tape with the feed hole perforation locations of the strip, and a pressure roller biased toward engagement with the sprocket roller for laminating said tape and strip together in the aligned condition, the improvement comprising:

a continuous circumferential groove in the peripheral surface of said pressure roller for receiving said teeth of said sprocket roller, said groove having a depth greater than the height of one of said teeth above the peripheral surface of said sprocket roller, and a width slightly less than the lateral width of said one tooth adjacent the peripheral surface of said sprocket roller.

13. The improvement as defined in claim 12 further comprising forming said teeth so that each tooth includes a substantially flat leading face and a substantially flat trailing face and dimensioned to align longitudinally the replacement feed holes of said tape with the replacement feed hole locations of said strip.

14. The improvement as defined in claim 13 wherein each of said teeth include curved lateral side faces connecting said leading and trailing faces, said lateral side faces being dimensioned to align laterally the replacement feed holes of said tape with the feed hole locations of said strip.

15. The improvement as defined in claim 14 wherein each of said teeth includes an upper portion tapered to provide ease of entry into and exit from said feed hole perforations, and terminating in a tip disposed closer to said leading face than to said trailing face.

16. The improvement as defined in claim 14 still further including means defining an exit ramp positioned to aid in lifting the laminated tape and strip out of engagement with said teeth of the sprocket roller after repair.

* * * * *